United States Patent
Ahn et al.

(10) Patent No.: US 11,505,629 B2
(45) Date of Patent: Nov. 22, 2022

(54) VINYL CHLORIDE POLYMER AND PRODUCTION METHOD THEREOF

(71) Applicant: LG CHEM, LTD., Seoul (KR)

(72) Inventors: Seong Yong Ahn, Daejeon (KR); Kun Ji Kim, Daejeon (KR); Se Woong Lee, Daejeon (KR); Jin Hyuck Ju, Daejeon (KR); Hyun Kyou Ha, Daejeon (KR)

(73) Assignee: LG Chem, Ltd., Seoul (KR)

( * ) Notice: Subject to any disclaimer, the term of this patent is extended or adjusted under 35 U.S.C. 154(b) by 8 days.

(21) Appl. No.: 16/962,747

(22) PCT Filed: Apr. 29, 2019

(86) PCT No.: PCT/KR2019/005160
§ 371 (c)(1),
(2) Date: Jul. 16, 2020

(87) PCT Pub. No.: WO2019/212217
PCT Pub. Date: Nov. 7, 2019

(65) Prior Publication Data
US 2020/0354490 A1    Nov. 12, 2020

(30) Foreign Application Priority Data

Apr. 30, 2018 (KR) .................. 10-2018-0049563
Apr. 25, 2019 (KR) .................. 10-2019-0048264

(51) Int. Cl.
| C08F 114/06 | (2006.01) |
| C08F 2/18 | (2006.01) |
| C08L 27/06 | (2006.01) |
| C08F 2/00 | (2006.01) |

(52) U.S. Cl.
CPC ............ *C08F 114/06* (2013.01); *C08F 2/001* (2013.01); *C08F 2/18* (2013.01); *C08L 27/06* (2013.01)

(58) Field of Classification Search
None
See application file for complete search history.

(56) References Cited

U.S. PATENT DOCUMENTS

| 3,970,612 A | 7/1976 | Witschard |
| 4,464,519 A * | 8/1984 | Mango .................. C08F 14/06 526/345 |
| 5,153,284 A | 10/1992 | Amano et al. |
| 6,433,060 B1 | 8/2002 | Bonardi et al. |
| 6,861,488 B2 | 3/2005 | Ooura et al. |
| 2005/0008027 A1 | 1/2005 | Limb et al. |
| 2005/0054795 A1 | 3/2005 | Westmijze et al. |
| 2007/0242673 A1 | 10/2007 | Limb et al. |
| 2007/0242693 A1 | 10/2007 | Limb et al. |
| 2010/0190946 A1 | 7/2010 | Ahn et al. |
| 2010/0267912 A1 | 10/2010 | Ahn et al. |
| 2011/0046328 A1 | 2/2011 | Westmijze et al. |
| 2011/0170507 A1 | 7/2011 | Limb et al. |
| 2015/0038659 A1 | 2/2015 | Bonardi et al. |
| 2017/0283533 A1 | 10/2017 | Ahn et al. |
| 2017/0291975 A1* | 10/2017 | Ahn ...................... C08F 222/10 |

FOREIGN PATENT DOCUMENTS

| CN | 104448092 A | 3/2015 |
| CN | 104877056 A | 9/2015 |
| CN | 106604940 A | 4/2017 |
| CN | 107778394 A | 3/2018 |
| EP | 1016678 A1 | 7/2000 |
| EP | 3168244 A1 | 5/2017 |
| GB | 877100 A | 9/1961 |
| JP | 10-338701 A | 12/1998 |
| JP | 2000219703 A | 8/2000 |
| JP | 2014-224176 A | 12/2014 |
| KR | 10-0160332 B1 | 1/1999 |
| KR | 10-2008-0018082 A | 2/2008 |
| KR | 10-2011-0008882 A | 1/2011 |
| KR | 10-2014-0109449 A | 9/2014 |
| KR | 10-2016-0143562 A | 12/2016 |
| KR | 10-2016-0143566 A | 12/2016 |
| KR | 10-2017-00882336 A | 7/2017 |
| KR | 10-1765842 B1 | 8/2017 |
| WO | 2007145416 A1 | 12/2007 |
| WO | WO-2016195435 A1 * | 12/2016 ............. C08F 18/16 |

OTHER PUBLICATIONS

Marquez, E. et al., "Mathematical Modeling of the Porosity of Suspension Poly(vinyl chloride)". AIChE J. 2004, 50(12), 3184-319. (Year: 2004).*

Guo, R. et al., "Agitating transformation during vinyl chloride suspension polymerization: aggregation morphology and PVC properties". RSC Adv., 2017, 7, 24022-24029. (Year: 2017).*

* cited by examiner

*Primary Examiner* — Richard A Huhn
(74) *Attorney, Agent, or Firm* — Dentons US LLP

(57) ABSTRACT

The present invention relates to a vinyl chloride polymer and a production method thereof. More specifically, the present invention provides a vinyl chloride polymer having a polydispersity index of 2.0 to 2.3 and a porosity of 60% or greater and a production method thereof in which a vinyl chloride polymerization seed having a conversion rate of 5-20% is first prepared through preliminary polymerization and then a vinyl chloride monomer is introduced into the vinyl chloride polymerization seed to polymerize (main polymerization) a vinyl chloride polymer.

8 Claims, No Drawings

VINYL CHLORIDE POLYMER AND PRODUCTION METHOD THEREOF

The present application is a National Phase Entry pursuant to 35 U.S.C. § 371 of International Application No. PCT/KR2019/005160 filed Apr. 29, 2019, and claims priority to and the benefit of Korean Patent Application Nos. 10-2018-0049563, filed on Apr. 30, 2018, and 10-2019-0048264, filed on Apr. 25, 2019, in the Korean Intellectual Property Office, the disclosures of which are incorporated herein in their entirety by reference.

FIELD

The present invention relates to a vinyl chloride polymer having excellent processability, improved fish eyes and initial coloring properties, and a production method of a vinyl chloride polymer, the method having improved polymerization productivity.

BACKGROUND

A vinyl chloride polymer is cheap while having excellent quality balance, and thus, is used in a wide range of fields, as a hard type or a soft type. Specifically, for the hard type, a vinyl chloride polymer is used for a pipe, a film, a window frame, and the like, and in for the soft type, a vinyl chloride polymer is used for a wire coating, a wrap film, a sheet, and the like.

In general, in order to reduce the production cost of a vinyl chloride polymer and improve the efficiency of a process, it is important to improve the polymerization productivity of a reaction per unit volume. As a method to improve the polymerization productivity, there is a method of maintaining polymerization reaction time constant while increasing a polymerization conversion rate, thereby increasing yield per batch and shortening polymerization reaction time.

Among such methods for improving polymerization productivity, as a method for increasing a polymerization conversion rate, a method of additionally introducing a vinyl chloride polymer as a polymerization initiator has been proposed. As an example, U.S. Patent Publication No. 2005-008027 discloses a method for increasing a polymerization conversion rate by additionally introducing an initiator when the internal pressure of a polymerization reactor is lowered. However, although a vinyl chloride polymer obtained by the above method has a slightly increased polymerization conversion rate, since the polymerization conversion rate when the internal pressure of a polymerization reactor is lowered is 70% or greater, an effect of increasing a polymerization conversion rate by an initiator introduced at this point of time is insignificant, and there is a problem in that fish eyes are increased or fine particles are increased, thereby deteriorating initial coloring properties. In addition, when considering the quality of a vinyl chloride polymer, and given that a typical polymerization conversion rate is 83-85%, a method for increasing a polymerization conversion rate is not quite effective in improving polymerization productivity. Therefore, in order to improve productivity of a vinyl chloride resin, a lot of effort has been made mostly to shorten polymerization reaction time.

As a method for shortening polymerization reaction time of a vinyl chloride polymer, U.S. Patent Publication No. 2005-0054795 discloses a method of introducing an initiator having a short half-life in the middle of a reaction. However, since an initiator having a short half-life is introduced in the middle of a reaction by the above method, non-uniform internal particle forms are made due to locally generated reaction heat, so that there is a problem in that fish eyes may be increased.

Also, Japanese Patent Publication No. 1998-338701 discloses a method for shortening polymerization reaction time by using both an oil-soluble initiator and a water-soluble initiator in the initial stage of polymerization. U.S. Pat. No. 6,861,488 discloses a vinyl chloride polymer production method in which an oil-soluble polymerization initiator, t-amylperoxyneodecanoate, and a peroxide-based polymerization initiator are used to prevent initial discoloration under suspension polymerization. However, although an effect of shortening reaction time by the above methods may be expected to some extent, when producing a vinyl chloride polymer, a vinyl chloride monomer, which is a substance having oil-soluble properties, is mostly present in a state of being phase-separated from deionized water which is polymerization water in the initial stage of polymerization. However, in the latter stage of polymerization when a polymerization reaction has proceeded and the polymerization conversion rate is 60% or greater, most of unreacted vinyl chloride monomers that have not been converted into polymers are present in a state of being dissolved in a water phase, so that the effect of shortening reaction time by a water-soluble initiator used together with an oil-soluble initiator in the initial stage of a reaction is not so great, and there is still a problem in which fish eyes occur due to fine particles generated by the water-soluble initiator in the initial stage of polymerization.

As such, although the above methods are methods proposed in order to improve polymerization productivity, there may be problems in that the quality of a polymer produced, such as fish eyes and initial coloring properties, may be deteriorated Furthermore, the processability of the polymer produced may not be guaranteed.

Therefore, studies are required on a method for producing a vinyl chloride polymer and a vinyl chloride polymer, the method capable of improving polymerization productivity while improving the quality of a polymer in terms of fish eyes and initial coloring properties, and improving the processability of the polymer.

PRIOR ART DOCUMENTS (Patent Document 1) 2005-008027A
(Patent Document 2) 2005-0054795A
(Patent Document 3) 1998-338701A

SUMMARY

An aspect of the present invention provides a method for producing a vinyl chloride polymer, the method having excellent processability while solving a problem of low polymerization productivity when producing a vinyl chloride polymer, and a problem of deterioration in fish eyes and initial coloring properties due to undissolved particles of a reactant. Specifically, an aspect of the present invention provides a production method in which a vinyl chloride polymerization seed having a conversion rate of 5-20% is prepared in a preliminary polymerization reactor, and then the vinyl chloride polymerization seed is transferred to a main polymerization reactor to polymerize a vinyl chloride polymer by controlling the difference in polymerization temperature between preliminary polymerization and main polymerization.

Another aspect of the present invention provides a vinyl chloride polymer having a polydispersity index of 2.0 to 2.3, a porosity of 60% or greater, and an average pore diameter of 300 nm or greater. The vinyl chloride polymer having improved quality in terms of fish eyes and initial coloring properties, and having excellent processability.

According to an aspect of the present invention, there is provided a vinyl chloride polymer having a polydispersity index (PDI) of 2.0 to 2.3, a porosity of 60% or greater, and an average pore diameter of 300 nm or greater.

According to another aspect of the present invention, there is provided a method for producing a vinyl chloride polymer, the method including polymerizing a first vinyl chloride monomer in a preliminary polymerization reactor such that the polymerization conversion rate thereof is 5-20% to prepare a vinyl chloride polymerization seed (Step 1), and transferring the vinyl chloride polymerization seed to a main polymerization reactor and then polymerizing the vinyl chloride polymerization seed with a second vinyl chloride monomer introduced into the main polymerization reactor to produce a vinyl chloride polymer (Step 2), wherein the difference in polymerization temperature between Step 1 and Step 2 is 5-15° C., and the vinyl chloride polymer is a vinyl chloride homopolymer.

A vinyl chloride polymer according to an embodiment of the present invention satisfies a polydispersity index of 2.0 to 2.3 and a porosity of 60% or greater. Therefore, the melt viscosity thereof is low when blended with a plasticizer and the like so that processability is excellent, and the plasticizer absorption rate thereof is excellent so that there is an effect in that the quality of fish eyes and the quality of initial coloring properties are improved.

In addition, a method for producing a vinyl chloride polymer according to an embodiment of the present invention performs polymerization through preliminary polymerization before main polymerization such that a polymerization conversion rate is 5-20% to prepare a vinyl chloride polymerization seed, and then performs the main polymerization using the polymerization seed while controlling the conversion rate of the polymerization seed, and the difference in polymerization temperature between the preliminary polymerization and the main polymerization to shorten polymerization reaction time. Therefore, the method has an effect in which polymerization productivity is significantly improved and the processability of a polymer to be produced, fish eyes, and initial coloring properties are excellent.

DETAILED DESCRIPTION

Hereinafter, the present invention will be described in more detail to facilitate understanding of the present invention.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

According to an embodiment of the present invention, there is provided a vinyl chloride polymer having a polydispersity index (PDI) of 2.0 to 2.3 and a porosity of 60% or greater.

In addition, the average pore diameter (4V/A) of the vinyl chloride polymer, according to an embodiment of the present invention, may be 300 nm or greater.

In the present invention, a "vinyl chloride polymer" refers to a compound produced by polymerizing vinyl chloride monomers, and may mean a polymer chain derived from vinyl chloride monomers.

Also, in the present invention, a "polydispersity index (PDI)" is an indicator representing the width of molecular weight distribution, and is a value representing the ratio (Mw/Mn) of weight average molecular weight (Mw) to number average molecular weight (Mn). That is, the polydispersity index is a value obtained by measuring weight average molecular weight and number average molecular weight and then dividing the weight average molecular weight by the number average molecular weight. At this time, in the present invention, 0.02 g of a vinyl chloride polymer sample was added into 20 ml of tetrahydrofuran (THF) to be dissolved therein for 24 hours and then the mixture was filtered with a 0.45 um filter to measure the number average molecular weight and the weight average molecular using GPC devices (Waters 2414 Refractive Index Detector, Waters 1525 Binary HPLC Pump, and Waters 717 Autosampler, Waters Company) under the conditions of 25° C. and atmospheric pressure (1 atm). Thereafter, using standard samples (Styrene standard molecular weight (g/mol) 1320, 2750, 6760, 19700, 50600, 124000, 279000, 768000, 1540000, 2350000), a calibration curve was drawn and then converted.

Also, in the present invention, surface voids (Pinter), accessible intravoids (Pacc), and inaccessible intravoids (Pinacc) were respectively measured from the amount of mercury intruded into a vinyl chloride polymer particle using a mercury porosity analyzer, specifically Auto Pore IV 9520 (Micromeritics Company), under the conditions of room temperature (23±2° C.) and atmospheric pressure (1 atm), and then the average pore diameter (4V/A) and the porosity were derived from the measurement results.

As in the present invention, a vinyl chloride polymer having a polydispersity index of 2.0 to 2.3, a porosity of 60% or greater, and an average pore diameter of 300 nm or more has excellent processability, and the quality of fish eyes may be improved and the problem of deterioration in initial coloring properties may be solved.

Specifically, a vinyl chloride polymer having a polydispersity index of 2.0 to 2.3 has excellent processability and good mechanical strength. On the contrary, when the polydispersity index is less than 2.0, since the molecular weight distribution is narrow, a problem in which processability is deteriorated during processing may occur. When the polydispersity index is greater than 2.3, since the molecular weight distribution is too wide, when a vinyl chloride polymer is blended with a plasticizer and a processing auxiliary raw material, the mechanical properties may be deteriorated.

Also, when porosity is less than 60%, the porosity is too low, so that the absorption rate of a plasticizer and an auxiliary raw material which are added during processing may be decreased. Accordingly, a blended material is not uniformly dispersed so that the quality of fish eyes and the quality of initial coloring properties may be deteriorated. In addition, when the average pore diameter is less than 300 nm, the diameter is too small, so that the absorption rate of a plasticizer and an auxiliary raw material may be decreased, causing the same problem described above.

Here, a fish eye refers to a white transparent particle generated due to undissolved particles of a reactant, and is an indicator for determining the protrusion quality of a polymer. The more fishy eyes, the lower the quality of a polymer.

Specifically, according to an embodiment of the present invention, a vinyl chloride polymer may have a porosity of 60-75%, more preferably a porosity of 60-70%, while satisfying the above range of polydispersity index. In addition, the average pore diameter thereof may be 300-600 nm, and more preferably, the average pore diameter thereof may be 300-500 nm. When the above value range is satisfied, the blending physical properties described above may be further maximized.

In addition, a vinyl chloride polymer according to an embodiment of the present invention may have a degree of polymerization of 700-1300, preferably 1000-1200. In the present invention, the "degree of polymerization" refers to the number of repeating units (unit bodies or monomers) constituting a polymer, and may be a value measured according to ASTM D1243-79.

In addition, a vinyl chloride polymer according to an embodiment of the present invention may be a homopolymer. A homopolymer is a polymer formed of a single type of monomers, and the vinyl chloride polymer of the present invention may be a polymer polymerized using a vinyl chloride monomer only.

A vinyl chloride polymer according to an embodiment of the present invention, the vinyl chloride polymer exhibiting the above-described physical properties may be produced by a seed polymerization method. At this time, a vinyl chloride polymerization seed may be prepared by performing polymerization in a preliminary polymerization reactor such that the polymerization conversion rate is 5-20%, and the difference in polymerization temperature between preliminary polymerization for polymerizing a seed, and main polymerization for polymerizing a vinyl chloride polymer to be finally produced, may be 5-15° C. Therefore, according to another embodiment of the present invention, a method for producing the vinyl chloride polymer is provided.

That is, the method for producing a vinyl chloride polymer according to an embodiment of the present invention may include a step of polymerizing a first vinyl chloride monomer in a preliminary polymerization reactor such that the polymerization conversion rate thereof is 5-20% to prepare a vinyl chloride polymerization seed (Step 1), and a step of transferring the vinyl chloride polymerization seed to a main polymerization reactor and then polymerizing the vinyl chloride polymerization seed with a second vinyl chloride monomer introduced into the main polymerization reactor to prepare a vinyl chloride polymer (Step 2). At this time, the difference in polymerization temperature between Step 1 and Step 2 is 10-15° C., and the vinyl chloride polymer may be a vinyl chloride homopolymer.

In addition, the method for producing a vinyl chloride polymer according to an embodiment of the present invention may be a method for producing the vinyl chloride polymer described above, specifically, a vinyl chloride polymer having a polydispersity index of 2.0 to 2.3 and a porosity of 60% or greater. Alternatively, the method may be a method for producing a vinyl chloride polymer having a polydispersity index of 2.0 to 2.3, a porosity of 60% or greater, and an average pore diameter of 300 nm or greater.

In addition, the polymerization of Step 1 and Step 2 may be performed by suspension polymerization, and the suspension polymerization may mean polymerization performed in the presence of a protective colloidal agent and a polymerization initiator. That is, the method for producing a vinyl chloride polymer according to an embodiment of the present invention may be a method for producing a polymer by suspension seed polymerization.

The method for producing a vinyl chloride polymer using a suspension polymerization seed as described above is a method in which a vinyl chloride polymerization seed is polymerized in a preliminary polymerization reactor before main polymerization, and then the vinyl chloride polymerization seed is transferred to a main polymerization reactor to be subjected to be a suspension polymerization reaction with a vinyl chloride monomer, so that polymerization reaction time is shortened to remarkably improve polymerization productivity, fish eyes generated due to undissolved particles of a reactant are prevented, and initial coloring properties may be improved. In addition, when a specific polymerization conversion rate and temperature difference between preliminary polymerization and main polymerization are satisfied, not only the above improvement effects but also the polydispersity index of a polymer to be produced is improved, so that there is an effect of improving processability.

Hereinafter, each step will be described in detail.

Step 1

Step 1 according to an embodiment of the present invention is a step for preparing a vinyl chloride polymerization seed using a preliminary polymerization reactor. Specifically, a first vinyl chloride monomer is polymerized in a preliminary polymerization reactor such that the polymerization conversion rate thereof is 5-20% to prepare a vinyl chloride polymerization seed. Step 1 may mean a preliminary polymerization step. The vinyl chloride polymerization seed of Step 1 may be prepared by suspension polymerization performed in the presence of a polymerization initiator and a protective colloid agent. In addition, the vinyl chloride polymerization seed is not dissolved in a vinyl chloride monomer (VCM), and the size of a seed particle is 100-120 µm.

It is preferable that a vinyl chloride polymerization seed is prepared by polymerization using a preliminary polymerization reactor such that the polymerization conversion rate is 5-20%. However, it is more preferable that a vinyl chloride polymerization seed is prepared by polymerization such that the polymerization conversion rate is 5-15%, more preferably 10-15%.

In the present invention, the polymerization conversion rate may be a value measured using a butane tracer with gas chromatography. Specifically, the polymerization conversion rate may be a value obtained by creating a polymerization conversion rate curve according to the ratio of a vinyl chloride monomer to butane over time under predetermined polymerization conditions whenever each polymerization condition is met, and measuring a polymerization conversion rate according to the polymerization conditions on the basis of the created polymerization conversion rate curve.

In Step 1), when a vinyl chloride polymerization seed is prepared such that the polymerization conversion rate is less than the above range, the polymerization seed is not sufficiently polymerized. Therefore, the amount of polymerization seeds to be introduced into the main polymerization reactor is too small, so that the effect of increasing polymerization productivity is insignificant. When a vinyl chloride polymerization seed is prepared such that the polymerization conversion rate is greater than the above range, the polymerization seed is grown to a certain extent and the stability is increased. Therefore, the coalescence/redispersion with a vinyl chloride monomer introduced from the main polymerization reactor is hard to occur, so that it may be difficult to control the internal shape of a polymer particle and the molecular weight of a polymer. Accordingly, it is difficult to control the polydispersity index, porosity, average pore diameter, and the like, so that it may be difficult to produce a high-quality vinyl chloride polymer having a stable quality of fish eyes, initial coloring properties, and the like. In addition, the processability may also be deteriorated.

The polymerization of Step 1) may be performed at a polymerization temperature of a vinyl chloride polymer by typical suspension polymerization. Specifically, the suspension polymerization may be performed at a temperature of 30-80° C., preferably at a temperature of 45-75° C. The temperature at the time of the suspension polymerization may be appropriately controlled within the above range according to the desired degree of polymerization and polymerization time (productivity). For example, in terms of degree of polymerization, the higher the desired degree of polymerization, the lower the temperature. The lower the desired degree of polymerization, the higher the temperature.

In addition, the stirring rate of the suspension polymerization may be a rate that is typically used for producing a vinyl chloride polymer. According to desired physical properties of a vinyl chloride polymer, the size of a reactor, the shape and kind of a stirrer, the stirring rate may be controlled. Accordingly, although not particularly limited, in one example of the present invention, the stirring rate may be 180 rpm to less than 250 rpm in a reactor of 1 m$^3$.

Step 1) according to an embodiment of the present invention includes, specifically, preparing a reaction mixture by mixing a protective colloid agent, a first vinyl chloride monomer, and a polymerization initiator in polymerization water. Here, the first vinyl chloride monomer means a vinyl chloride monomer, which may be the same as a second vinyl chloride monomer to be described later, or may be one numbered to identify the order of introduction.

At this time, the polymerization water is a polymerization solvent, and various kinds of polymerization water such as distilled water or deionized water may be used as the polymerization water. Preferably, deionized water may be used. The temperature of the polymerization water may be appropriately determined in consideration of the temperature at which suspension polymerization is performed, and the amount of the polymerization water may also be appropriately determined according to polymerization conditions. For example, the total content of the polymerization water of Step 1) and Step 2) may be 70 parts by weight or greater based on 100 parts by weight of the first and second vinyl chloride monomers.

The protective colloid agent may be used for the purpose of maintaining the stability of a vinyl chloride monomer in the production process of a vinyl chloride polymer and obtaining a desired degree of physical properties of a vinyl chloride polymer, such as the average particle size, apparent specific gravity (B.D.), particle diameter distribution, and plasticizer absorption rate (CPA). The protective colloid agent may be, for example, one or more selected from the group consisting of a vinyl alcohol-based resin having a hydration degree of 30-90% and a viscosity of 5-100 cps in a 4% aqueous solution at room temperature, cellulose having a methoxy group of 15-40 wt % and a propyl hydroxide group of 3-20 wt %, and a viscosity of 10-20,000 cps in a 2% aqueous solution measured at 23±5° C., and an unsaturated organic acid. Preferably, the protective colloid agent may be a vinyl alcohol-based resin having a hydration degree of 30-90% and a viscosity of 5-100 cps in a 4% aqueous solution at room temperature, cellulose having a methoxy group of 15-40 wt % and a propyl hydroxide group of 3-20 wt % and a viscosity of 10-20,000 cps in a 2% aqueous solution measured at room temperature (20±5° C.), or a mixture thereof. At this time, the unit of hydration degree % may be interpreted as wt %.

In addition, the total content of the protective colloid agent of Step 1) and Step 2) may be 0.03-5.0 parts by weight, preferably 0.05-2.5 parts by weight, based on 100 parts by weight of the first and second vinyl chloride monomers. When the total amount of the protective colloid agent used is less than 0.03 parts by weight, droplet stability is decreased and the particle size of a polymerization seed and the particle size of a vinyl chloride polymer to be finally polymerized are excessively increased, so that fish eyes may be generated. When greater than 5.0 parts by weight, initial coloring properties may be deteriorated due to the increase in fine particles.

Meanwhile, in one example of the present invention, the protective colloid agent may include a mixture of two or more vinyl alcohol-based resins with different hydration degrees. For example, the protective colloid agent may include a mixture of a vinyl alcohol-based resin (high hydration degree resin) having a hydration degree of greater than 50% to 90% or less, and a vinyl alcohol-based resin (low hydration degree resin) having a hydration degree of 30% to 50%.

In addition, the protective colloid agent may include the cellulose in addition to the vinyl alcohol-based resin. At this time, the total content of the cellulose may be 0.001-0.5 parts by weight based on 100 parts by weight of the first and second vinyl chloride monomers. Examples of the cellulose may include methyl cellulose, hydroxy ethyl cellulose, hydroxy propyl methyl cellulose, and the like, and any one thereof or a mixture of two or more thereof may be used. Among the above, the protective colloid agent may be hydroxy propyl methyl cellulose, and the cellulose may be, more specifically, one having a methoxy group of 15-40 wt % and a propyl hydroxide group of 3-20 wt %, and a viscosity of 10-20,000 cps in a 2% aqueous solution measured at 20±5° C.

In addition, examples of the unsaturated organic acid polymer may include an acrylic acid polymer, a methacrylic acid polymer, an itaconic acid polymer, a fumaric acid polymer, a maleic acid polymer, a succinic acid polymer, and the like, and any one thereof or a mixture of two or more thereof may be used.

In addition, the total content of the polymerization initiator of Step 1) and Step 2) according to an embodiment of the present invention may be 0.02 parts by weight to 0.2 parts by weight, based on 100 parts by weight of the first and second vinyl chloride monomers used in the polymerization. Specifically, the polymerization initiator may be used in an amount of 0.03 parts by weight to 0.12 parts by weight, based on 100 parts by weight of the first and second vinyl chloride monomers. If the total content of the polymerization initiator is less than 0.02 parts by weight, the polymerization reaction time is increased and the rate of conversion into a vinyl chloride polymer is lowered, so that productivity may be deteriorated. When greater than 0.2 parts by weight, the polymerization initiator is not completely consumed during the polymerization, thereby remaining in a vinyl chloride polymer finally produced, so that the thermal stability and color quality of the polymer may be deteriorated.

The polymerization initiator is not particularly limited, and may be, for example, a diacyl peroxide-based initiator such as dicumyl peroxide, dipentyl peroxide, di-3,5,5-trimethylhexanoyl peroxide and dilauryl peroxide, a peroxydicarbonate-based initiator such as diisopropyl peroxydicarbonate, di-sec-butyl peroxydicarbonate, di-2-ethylhexyl peroxydicarbonate, and cumyl peroxydicarbonate, a peroxy ester-based initiator such as t-butyl peroxyneodecanoate, a t-butyl peroxyneoheptanoate, a t-amyl peroxyneodecanoate, a cumyl peroxyneodecanoate, a cumyl peroxyneoheptanoate, 1,1,3,3-tetramethylbutyl peroxyneodecanoate, and a hydroxy-dimethylbutyl peroxy ester, an azo compound such as azobis-2,4-dimethylvaleronitrile, a sulfate-based initiator such as potassium persulfate and ammonium persulfate. Any single one thereof or a combination of two or more thereof may be used.

The method for producing a vinyl chloride polymer according to an embodiment of the present invention may include stirring the reaction mixture prepared above, and suspension polymerization may be performed through the stirring.

In addition, the method for producing a vinyl chloride polymer according to an embodiment of the present invention may further include, if necessary, any one or a mixture of two or more of sodium bicarbonate ($NaHCO_3$), sodium borate ($Na_2B_4O_7$), sodium phosphate dibasic ($Na_2HPO_4$), sodium carbonate ($Na_2CO_3$), potassium dihydrogen phosphate ($KH_2PO_4$), ammonium hydroxide ($NH_4OH$), potassium tartrate ($KHC_4H_4O_6$), potassium hydrogen phthalate ($KHC_8H_4O_4$), and calcium hydroxide ($Ca(OH)_2$) as a hydrogen ion concentration control agent.

In addition, the method or producing a vinyl chloride polymer according to an embodiment of the present invention may further include, if necessary, any one or a mixture of two or more of DiAllyl Maleate (DAM), DiAllyl Phthalate (DAP), Ethyl Glycol DiMethyl Acrylate (EGDMA) and TriAllyl Isocyanurate (TAIC) as a cross-linking agent.

In addition, at one specific point in the polymerization conversion rate range specified in Step 1), the prepared vinyl chloride polymerization seed and unreacted monomers may all be transferred to the main polymerization reactor to proceed with main polymerization.

Step 2

Step 2) according to an embodiment of the present invention is a step for producing a vinyl chloride polymer through the main polymerization using the vinyl chloride polymerization seed prepared in Step 1). Specifically, the vinyl chloride polymerization seed of Step 1) is transferred to a main polymerization reactor and then polymerized with a second vinyl chloride monomer introduced into the main polymerization reactor to produce a vinyl chloride polymer. In addition, Step 2) may mean a main polymerization step. In addition, a vinyl chloride polymer produced after Step 2) is performed may be a homopolymer.

That is, Step 2) may be a step in which the vinyl chloride polymerization seed of Step 1) is transferred to a main polymerization reactor and then the transferred vinyl chloride polymerization seed is polymerized with a second vinyl chloride monomer introduced into the main polymerization reactor to produce a vinyl chloride polymer.

The method for producing a vinyl chloride polymer according to an embodiment of the present invention produces a vinyl chloride homopolymer, so that polymerization productivity may be significantly improved when compared to a process of producing a copolymer since compatibility between monomers is excellent.

In addition, in the case of a copolymer, the structure and properties of the entire polymer may vary depending on the type and content ratio of a comonomer which is copolymerized with a vinyl chloride monomer, so that it is not easy to control the degree of polymerization. Also, since it is difficult to ensure the reliability of the degree of polymerization measured by a measurement method of the present invention due to the influence of a co-monomer, an accurate degree of polymerization cannot be measured. In addition, even when blending is performed with a resin composition, physical properties greatly vary depending on the type and content ratio of a comonomer as described above, so that it is difficult to predict blending physical properties when compared to those of a homopolymer, and thus, it is not easy to control the quality and the like of a molded article. Therefore, the vinyl chloride polymer of the present invention is characterized in being specified as a vinyl chloride homopolymer to solve the above problems of a copolymer and to ensure excellent polymerization productivity and blending physical properties.

According to an embodiment of the present invention, the order of the point of time of transferring a vinyl chloride polymerization seed prepared in Step 1) and the point of time of introducing a second vinyl chloride monomer into a main polymerization reactor is not particularly limited. For example, the vinyl chloride polymerization seed may be transferred to a main polymerization reactor while the main polymerization reactor is filled with a second vinyl chloride monomer, or the vinyl chloride polymerization seed may be transferred to a main polymerization reactor and then a second vinyl chloride monomer may be introduced into the main polymerization reactor. In another example, the transferring of a vinyl chloride polymerization seed and the introduction of a second vinyl chloride monomer into a main polymerization reactor may be simultaneously performed.

Step 2) may be applied with the same suspension polymerization method described in Step 1). Specifically, suspension polymerization may be performed in the presence of a protective colloid agent and a polymerization initiator in addition to the vinyl chloride polymerization seed prepared in Step 1). At this time, the protective colloid agent and the polymerization initiator may be introduced into the main polymerization reactor simultaneously with the second vinyl chloride monomer, or may be introduced into the main polymerization reactor before the second vinyl chloride monomer is introduced thereinto. Also, the protective colloid agent and the polymerization initiator may be selected from the types of protective colloid agent and the polymerization initiator described in Step 1), and the protective colloid agent and the polymerization initiator applied in Step 2) may be the same as or different from the protective colloid agent and the polymerization initiator in Step 1). In addition, in Step 2), the polymerization water described in Step 1) may be further included in a reaction mixture, and if necessary, a hydrogen ion concentration control agent and a cross-linking agent may be further introduced. At this time, the polymerization water, the hydrogen ion concentration control agent, and the cross-linking agent applied in Step 2) may be the same as or different from the polymerization water, the hydrogen ion concentration control agent, and the cross-linking agent in Step 1).

In addition, the polymerization temperature of Step 2) may be a temperature different from the polymerization temperature of Step 1) by 5-15° C., and preferably, the difference in polymerization temperature between Step 1) and Step 2) may be 10-15° C. When the difference in polymerization temperature between Step 1) and Step 2) satisfies the range of 5-15° C., a vinyl chloride polymer having a polydispersity index of 2.0 to 2.3 may be produced, and since the vinyl chloride polymer has the above range of polydispersity index, there is an effect in that processability is improved.

In addition, as long as the polymerization temperature of Step 1) and the polymerization temperature of Step 2) satisfy the temperature difference of the range described above, whether the polymerization temperature of Step 1) is higher or lower than the polymerization temperature of Step 2) is not particularly limited. When considering the improvement of the physical properties of a vinyl chloride polymer to be produced, the polymerization temperature of Step 2) may be controlled to be higher than the polymerization temperature of Step 1). However, when considering the improvement of polymerization productivity and the shortening of polymerization time, it is preferable that the polymerization temperature of Step 1) is higher than that of Step 2). Also, the first vinyl chloride monomer and the second vinyl chloride monomer described above are merely terms for distinguishing the introduction order. In order to produce a vinyl chloride homopolymer, it is preferable that the first vinyl chloride monomer and the second vinyl chloride monomer are the same vinyl chloride monomer.

In addition, the second vinyl chloride monomer of Step 2) may be introduced more than the first vinyl chloride monomer of Step 1), and the weight ratio of the first vinyl chloride monomer to the second vinyl chloride monomer may be, for example, 1:1.2 to 1:10, preferably 1:2 to 1:8.

Furthermore, Step 2) of the method for producing a vinyl chloride polymer according to an embodiment of the present invention may further include terminating the polymerization and recovering a product (vinyl chloride polymer).

At this time, the suspension polymerization may be terminated by introducing a reaction terminator, and the point of time of the termination may be when the pressure in the reactor is 6 kgf/cm$^2$ to 8 kgf/cm$^2$ (or when the polymerization conversion is greater than 85%).

The reaction terminator is not particularly limited. For example, the reaction terminator may be a phenolic compound, an amine compound, a nitrile compound, a sulfur compound, and the like. Specifically, the reaction terminator may be any one selected from a phenolic compound such as triethylene glycol-bis-3-(3-t-butyl-4-hydroxy-5-methylphenyl)propionate, hydroquinone, p-methoxyphenol, t-butylhydroxyanisole, n-octadecyl-3-(4-hydroxy-3,5-di-t-butylphenyl)propionate, 2,5-di-t-butyl hydroquinone, 4,4'-butylidenebis(3-methyl-6-t-butyl phenol), t-butyl catechol, 4,4'-thiobis(6-t-butyl-m-cresol), and tocophenol, an amine compound such as N,N'-diphenyl-p-phenylenediamine and 4,4'-bis(dimethylbenzyl)diphenyl amine, a nitrile compound such as 2-phenyl nitronylnitroxide, 3-imidazoline nitroxide, 4-hydroxy-2,2',6,6'-tetramethyl-piperidine-1-oxyl, a sulfur compound such as dodecyl mercaptan and 1,2-diphenyl-2-thiol, a phosphoric acid-based compound such as triphenyl phosphite, diphenyldecyl phosphite, phenylisodecyl phosphite, tri(nonylphenyl)phosphite, and trilauryl trithiophosphite. Preferably, the reaction terminator may include triethylene glycol-bis-3-(3-t-butyl-4-hydroxy-5-methylphenyl)propionate.

The vinyl chloride polymer produced according to the termination of the polymerization may be in the form of slurry, and the slurry may be produced in the form of a vinyl chloride polymer to be finally produced by removing moisture using a fluidized bed dryer under typical reaction conditions.

In addition, in the polymerization of the Step 1) and Step 2), additives such as a polymerization control agent, a chain transfer agent, a pH control agent, an antioxidant, a cross-linking agent, an anti-static agent, a scale inhibitor, a surfactant, and the like may be additionally added if necessary in addition to the active ingredients described above, and the type and content of the additive are not particularly limited. A typically known type of additive may be used in a content typically known in the art. The additive may be added at any point of time in suspension polymerization, such as in the beginning of suspension polymerization, in the middle thereof, or thereafter. The additive may be added all at the same time or continuously.

The reactor used in the present invention is not particularly limited in the shape of a stirring device such as a stirrer and a baffle. Any stirring device commonly used for suspension polymerization of a vinyl chloride polymer may be used. Specifically, as the stirrer, a stirrer having a single stirring blade such as a paddle blade, a pitched paddle blade, a bloomers gin blade, a paudora blade, a turbine blade, and a propeller blade, or two or more thereof may be used. As the baffle, a baffle having a plate shape, a cylindrical shape, a D shape, a loop shape, or a finger shape may be used.

Hereinafter, the present invention will be described in more detail with reference to Examples and Experimental Examples. However, the following Examples and Experimental Examples are merely illustrative of the present invention, and are not intended to limit the scope of the present invention.

EXAMPLES

Example 1

Into a reactor (preliminary polymerization reactor) having an internal volume of 0.2 m$^3$, 90 kg of deionized water, 45 g of hydroxy-dimethylbutyl peroxy ester, 60 g of polyvinyl alcohol having a degree of hydration of 80% and a viscosity of 30 cps in a 4% aqueous solution at room temperature, 40 g of polyvinyl alcohol having a degree of hydration of 40% and a viscosity of 20 cps in a 4% aqueous solution at room temperature, were introduced. After applying vacuum, 75 kg of vinyl chloride monomers were introduced into the reactor and the polymerization temperature was raised to 62° C. to proceed with a polymerization reaction. Thereafter, when the polymerization conversion rate reached 13% (13±2%), a vinyl chloride polymerization seed was prepared and unreacted monomers were all transferred to a main polymerization reactor. At this time, the polymerization conversion rate was measured using a butane tracer with gas chromatography. Under predetermined polymerization conditions, a polymerization conversion rate curve according to the ratio of a vinyl chloride monomer to butane over time may be created whenever each polymerization condition was met, and on the basis of the created polymerization conversion rate curve, a polymerization conversion rate according to the polymerization conditions may be measured.

Into a reactor (main polymerization reactor) having an internal volume of 1 m$^3$ and a reflux condenser, 360 kg of deionized water, 60 g of cumyl peroxydicarbonate, and 120 g of t-butyl peroxyneodecanoate, were introduced, and then 150 g of polyvinyl alcohol having a degree of hydration of 80% and a viscosity of 30 cps in a 4% aqueous solution at room temperature, 120 g of polyvinyl alcohol having a degree of hydration of 40% and a viscosity of 20 cps in a 4% aqueous solution at room temperature, and 30 g of hydroxypropylmethyl cellulose having a propyl hydroxide group of 10 wt % and a viscosity of 100 cps in a 2% aqueous solution measured at room temperature, were introduced. After applying vacuum, 300 kg of vinyl chloride monomers were introduced into the reactor.

When the transferring of the vinyl chloride polymerization seed and the unreacted monomers from the preliminary polymerization reactor is completed, the temperature of a polymerization reaction is controlled to be 57° C. and maintained to be the same throughout the entire polymerization reaction. When the pressure in the polymerization reactor reached 6.5 kgf/cm², 60 g of triethylene glycol-bis-3-(3-t-butyl-4-hydroxy-5-methylphenyl)propionate (antioxidant) was added, and unreacted monomers were recovered and polymer slurry was recovered in the polymerization reactor. The polymerization conversion rate when the polymerization was terminated was 84% (84±2%). The obtained slurry was dried in a fluidized bed dryer in a typical manner to obtain a vinyl chloride polymer.

Example 2

A vinyl chloride polymer was obtained in the same manner as in Example 1 except that the polymerization reaction temperature of the preliminary polymerization reactor was raised to 67° C. to proceed with a polymerization reaction, and the polymerization reaction temperature of the main polymerization reactor was controlled to be 56° C. to proceed with a polymerization reaction, and then when the pressure of the polymerization reactor reached 6.3 kgf/cm² (when the polymerization conversion rate was 84% (84±2%), the polymerization reaction was terminated.

Example 3

A vinyl chloride polymer was obtained in the same manner as in Example 1 except that the polymerization reaction temperature of the preliminary polymerization reactor was raised to 70° C. to proceed with a polymerization reaction, and the polymerization reaction temperature of the main polymerization reactor was controlled to be 55.5° C. to proceed with a polymerization reaction, and then when the pressure of the polymerization reactor reached 6.2 kgf/cm² (when the polymerization conversion rate was 84% (84±2%), the polymerization reaction was terminated.

Example 4

A vinyl chloride polymer was obtained in the same manner as in Example 1 except that the polymerization reaction temperature of the preliminary polymerization reactor was raised to 67° C. to proceed with a polymerization reaction and when the polymerization conversion rate reached 7% (7±2%), a vinyl chloride polymerization seed prepared and unreacted monomers were all transferred to a main polymerization reactor, and then the polymerization reaction temperature of the main polymerization reactor was controlled to be 57° C. to proceed with a polymerization reaction, and when the pressure of the polymerization reactor reached 6.5 kgf/cm² (when the polymerization conversion rate was 84% (84±2%), the polymerization reaction was terminated.

Example 5

A vinyl chloride polymer was obtained in the same manner as in Example 1 except that the polymerization reaction temperature of the preliminary polymerization reactor was raised to 68° C. to proceed with a polymerization reaction and when the polymerization conversion rate reached 18% (18±2%), a vinyl chloride polymerization seed prepared and unreacted monomers were all transferred to a main polymerization reactor, and then the polymerization reaction temperature of the main polymerization reactor was controlled to be 54.5° C. to proceed with a polymerization reaction, and when the pressure of the polymerization reactor reached 6.0 kgf/cm² (when the polymerization conversion rate was 84% (84±2%), the polymerization reaction was terminated.

Example 6

A vinyl chloride polymer was obtained in the same manner as in Example 1 except that the polymerization reaction temperature of the preliminary polymerization reactor was raised to 54.5° C. to proceed with a polymerization reaction and when the polymerization conversion rate reached 13% (13±2%), a vinyl chloride polymerization seed prepared and unreacted monomers were all transferred to a main polymerization reactor, and then the polymerization reaction temperature of the main polymerization reactor was controlled to be 60° C. to proceed with a polymerization reaction, and when the pressure of the polymerization reactor reached 7.0 kgf/cm² (when the polymerization conversion rate was 84% (84±2%), the polymerization reaction was terminated.

Comparative Example 1

Into a reactor (main polymerization reactor) having an internal volume of 1 m³ and a reflux condenser, 360 kg of deionized water, 60 g of cumyl peroxydicarbonate, and 120 g of t-butyl peroxyneodecanoate were introduced, and then 150 g of polyvinyl alcohol having a degree of hydration of 80% and a viscosity of 30 cps in a 4% aqueous solution at room temperature, 120 g of polyvinyl alcohol having a degree of hydration of 40% and a viscosity of 20 cps in a 4% aqueous solution at room temperature, and 30 g of hydroxypropylmethyl cellulose having a propyl hydroxide group of 10 wt % and a viscosity of 100 cps in a 2% aqueous solution measured at room temperature, were introduced into the reactor. After applying vacuum, 300 kg of vinyl chloride monomers were introduced thereinto. The polymerization reaction temperature was raised to 57° C. and maintained to be the same throughout the entire polymerization reaction to proceed with a polymerization reaction. When the pressure of the polymerization reactor reached 6.5 kgf/cm² (when the polymerization conversion rate was 84% (84±2%), 15 g of 4-hydroxy-2,2,6,6-tetramethyl-piperidine-1-oxyl and 60 g of triethylene glycol-bis-3-(3-t-butyl-4-hydroxy-5-methylphenyl)propionate were added as reaction terminators, and unreacted monomers were recovered and polymer slurry was recovered in the polymerization reactor. The slurry obtained as described above was dried in a fluidized bed dryer in a typical manner to obtain a vinyl chloride polymer.

Comparative Example 2

Into a reactor (main polymerization reactor) having an internal volume of 1 m³ and a reflux condenser, 450 kg of deionized water, 75 g of cumyl peroxydicarbonate, and 150 g of t-butyl peroxyneodecanoate were introduced, and then 188 g of polyvinyl alcohol having a degree of hydration of 80% and a viscosity of 30 cps in a 4% aqueous solution at room temperature, 120 g of polyvinyl alcohol having a degree of hydration of 40% and a viscosity of 20 cps in a 4% aqueous solution at room temperature, and 37 g of hydroxypropylmethyl cellulose having a propyl hydroxide group of 10 wt % and a viscosity of 100 cps in a 2% aqueous solution measured at room temperature, were introduced. After applying vacuum, 375 kg of vinyl chloride monomers were introduced into the reactor. The polymerization reaction temperature was raised to 57° C. and maintained to be the same throughout the entire polymerization reaction to proceed with a polymerization reaction. When the pressure of the polymerization reactor reached 6.5 kgf/cm$^2$ (when the polymerization conversion rate was 84% (84±2%), 15 g of 4-hydroxy-2,2,6,6-tetramethyl-piperidine-1-oxyl and 75 g of triethylene glycol-bis-3-(3-t-butyl-4-hydroxy-5-methylphenyl)propionate were added as reaction terminators, and unreacted monomers were recovered and polymer slurry was recovered in the polymerization reactor. The slurry obtained as described above was dried in a fluidized bed dryer in a typical manner to obtain a vinyl chloride polymer.

Comparative Example 3

A vinyl chloride polymer was obtained in the same manner as in Example 1 except that the polymerization reaction temperature of the preliminary polymerization reactor was raised to 60° C. to proceed with a polymerization reaction and when the polymerization conversion rate reached 3% (3±1%), a vinyl chloride polymerization seed prepared and unreacted monomers were all transferred to a main polymerization reactor, and then the polymerization reaction temperature of the main polymerization reactor was controlled to be 57° C. to proceed with a polymerization reaction, and when the pressure of the polymerization reactor reached 6.5 kgf/cm$^2$ (when the polymerization conversion rate was 84% (84±2%), the polymerization reaction was terminated.

Comparative Example 4

A vinyl chloride polymer was obtained in the same manner as in Example 1 except that the polymerization reaction temperature of the preliminary polymerization reactor was raised to 65° C. to proceed with a polymerization reaction and when the polymerization conversion rate reached 25% (25±2%), a vinyl chloride polymerization seed prepared and unreacted monomers were all transferred to a main polymerization reactor, and then the polymerization reaction temperature of the main polymerization reactor was controlled to be 56° C. to proceed with a polymerization reaction, and when the pressure of the polymerization reactor reached 6.3 kgf/cm$^2$ (when the polymerization conversion rate was 84% (84±2%), the polymerization reaction was terminated.

Comparative Example 5

A vinyl chloride polymer was obtained in the same manner as in Example 1 except that the polymerization reaction temperature of the preliminary polymerization reactor was raised to 69° C. to proceed with a polymerization reaction and when the polymerization conversion rate reached 18% (18±2%), a vinyl chloride polymerization seed prepared and unreacted monomers were all transferred to a main polymerization reactor, and then the polymerization reaction temperature of the main polymerization reactor was controlled to be 52° C. to proceed with a polymerization reaction, and when the pressure of the polymerization reactor reached 5.7 kgf/cm$^2$ (when the polymerization conversion rate was 84% (84±2%), the polymerization reaction was terminated.

Comparative Example 6

A vinyl chloride polymer was obtained in the same manner as in Example 1 except that the polymerization reaction temperature of the preliminary polymerization reactor was raised to 57° C. and when the pressure of the polymerization reactor reached 6.5 kgf/cm$^2$ (when the polymerization conversion rate was 84% (84±2%), the polymerization reaction was terminated.

Comparative Example 7

Into a reactor having an internal volume of 0.2 m$^3$ and a reflux condenser, 80 kg of deionized water was introduced, and then 25 g of polyvinyl alcohol having a degree of hydration of 80%, 20 g of polyvinyl alcohol having a degree of hydration of 42%, and 5 g of hydroxypropylmethyl cellulose, were introduced into the reactor. Thereafter, 34 kg of a mixture of di(2-ethylhexyl)maleate and di(2-ethylhexyl)fumarate (weight ratio=95:5) were introduced thereinto together with 50 kg of vinyl chloride monomers, followed by introducing 30 g of di-2-ethylhexyl peroxydicarbonate to initiate a reaction. The reaction progressed while the temperature was maintained to be 57° C. throughout the entire polymerization reaction, and when the polymerization conversion rate reached 15% (15±2%), a reaction product produced and unreacted monomers were all transferred to a secondary polymerization reactor.

Into a reactor having an internal volume of 1 m$^3$ and a reflux condenser, 360 kg of deionized water was introduced, and then 150 g of polyvinyl alcohol having a degree of hydration of 80%, 120 g of polyvinyl alcohol having a degree of hydration of 42%, and 30 g of hydroxypropylmethyl cellulose, were introduced into the reactor. Thereafter, 300 kg of vinyl chloride monomers were introduced thereinto, followed by introducing 60 g of dicumyl peroxide and 120 g of t-butyl peroxyneodecanoate to initiate a reaction.

The reaction progressed while the temperature was maintained to be 57° C. throughout the entire polymerization reaction, and when the pressure of the polymerization reactor reached 6.0 kgf/cm$^2$ (when the polymerization conversion rate was 84% (84±2%), 35 g of 4-hydroxy-2,2,6,6-tetramethyl-piperidine-1-oxyl and 35 g of triethylene glycol-bis-3-(3-t-butyl-4-hydroxy-5-methylphenyl)propionate were added as reaction terminators, and unreacted monomers were separated and recovered and the prepared copolymer was recovered from the polymerization reactor and then dried in a fluidized bed dryer to obtain a copolymer.

The polymerization conditions of the preliminary polymerization and the main polymerization of Examples 1 to 6 and Comparative Examples 1 to 7 are summarized in Table 1 below.

TABLE 1

|  |  | Monomer (Polymer) | Preliminary polymerization conversion rate (%) | Preliminary polymerization temperature (° C.) | Main polymerization temperature (° C.) |
|---|---|---|---|---|---|
| Examples | 1 | Vinyl chloride (homopolymer) | 13(13 ± 2) | 62 | 57 |
|  | 2 | Vinyl chloride (homopolymer) | 13(13 ± 2) | 67 | 56 |
|  | 3 | Vinyl chloride (homopolymer) | 13(13 ± 2) | 70 | 55.5 |
|  | 4 | Vinyl chloride (homopolymer) | 7(7 ± 2) | 67 | 57 |
|  | 5 | Vinyl chloride (homopolymer) | 18(18 ± 2) | 68 | 54.5 |
|  | 6 | Vinyl chloride (homopolymer) | 13(13 ± 2) | 54.5 | 60 |
| Comparative Examples | 1 | Vinyl chloride (homopolymer) | (Single reaction) | — | 57 |
|  | 2 | Vinyl chloride (homopolymer) | (Single reaction) | — | 57 |
|  | 3 | Vinyl chloride (homopolymer) | 3(3 ± 1) | 60 | 57 |
|  | 4 | Vinyl chloride (homopolymer) | 25(25 ± 2) | 65 | 56 |
|  | 5 | Vinyl chloride (homopolymer) | 18(18 ± 2) | 69 | 52 |
|  | 6 | Vinyl chloride (homopolymer) | 13(13 ± 2) | 57 | 57 |
|  | 7 | Vinyl chloride, di(2-ethylhexyl)maleate and di(2-ethylhexyl)fumarate (copolymer) | 15(15 ± 2) | 57 | 50 |

Here, the preliminary polymerization conversion rate (%) means the polymerization conversion rate in the preliminary polymerization reaction immediately before the transferring to the main polymerization reactor.

Experimental Example 1

Polymerization Productivity and Polymer Physical Properties

1) Evaluation of Polymerization Productivity

In order to evaluate the polymerization productivity of the vinyl chloride polymer of each of Examples 1 to 6 and Comparative Examples 1 to 7, the yield of PVC polymers produced per hour was measured in production yield unit per batch, and the results are shown in Table 2 below.

2) Measurement of Degree of Polymerization

The degree of polymerization was measured by ASTM D1243-79.

3) Measurement of Molecular Weight

The weight average molecular weight (Mw), the number average molecular weight (Mn), and the polydispersity index were respectively measured for the vinyl chloride polymer produced in each of Examples 1 to 6 and Comparative Examples 1 to 7. Specifically, 0.02 g of a vinyl chloride polymer sample was added into 20 ml of tetrahydrofuran (THF) to be dissolved therein for 24 hours and then the mixture was filtered with a 0.45 um filter to measure the number average molecular weight and the weight average molecular using GPC devices (Waters 2414 Refractive Index Detector, Waters 1525 Binary HPLC Pump, and Waters 717 Autosampler, Waters Company) under the conditions of 25° C. and atmospheric pressure (1 atm). Thereafter, using standard samples (Styrene standard molecular weight (g/mol) 1320, 2750, 6760, 19700, 50600, 124000, 279000, 768000, 1540000, 2350000), a calibration curve was drawn and then converted to determine Mw and Mn, respectively, and the polydispersity index was determined from the ratio of Mw/Mn. The results are shown in Table 2 below.

4) Measurement of Pore Properties

The pore properties were measured for the vinyl chloride polymer produced in each of Examples 1 to 6 and Comparative Examples 1 to 7 by a method using mercury porosimetry. Specifically, using a mercury porosity analyzer (Auto Pore IV 9520, manufactured by Micromeritics Company) under the conditions of room temperature (23±2° C.) and atmospheric pressure (1 atm), surface voids (Pinter), accessible intravoids (Pacc), and inaccessible intravoids (Pinacc) were respectively measured from the amount of mercury intruded into a vinyl chloride polymer particle, and then the average pore diameter (4V/A) and the porosity were respectively calculated from the measurement results. The results are shown in Table 2 below. At this time, the porosity represents a percentage by volume.

TABLE 2

| | | Polymerization duration (min) | Polymerization production yield per unit time | | Degree of polymeri-zation | Molecular weight (Mn, Mw: g/mol) | | | Average pore diameter (nm) | Porosity (%) |
|---|---|---|---|---|---|---|---|---|---|---|
| | | | kg/day | MT/year | | Mn | Mw | PDI | | |
| Examples | 1 | 220 | 2048 | 748 | 1028 | 74014 | 153648 | 2.08 | 324.3 | 61.11 |
| | 2 | 215 | 2096 | 765 | 1032 | 73233 | 155914 | 2.13 | 345.4 | 67.80 |
| | 3 | 212 | 2125 | 776 | 1030 | 72082 | 161535 | 2.24 | 415.3 | 65.29 |
| | 4 | 220 | 2042 | 746 | 1033 | 73755 | 158190 | 2.15 | 308.3 | 63.28 |
| | 5 | 205 | 2202 | 804 | 1035 | 73126 | 160684 | 2.20 | 363.6 | 60.54 |
| | 6 | 235 | 1917 | 700 | 1024 | 73315 | 151127 | 2.06 | 312.6 | 61.94 |
| Comparative Examples | 1 | 270 | 1328 | 485 | 1032 | 75019 | 135296 | 1.80 | 248.6 | 55.59 |
| | 2 | 280 | 1601 | 584 | 1030 | 74868 | 139081 | 1.86 | 255.4 | 56.07 |
| | 3 | 262 | 1713 | 625 | 1028 | 72793 | 141528 | 1.94 | 288.9 | 58.59 |
| | 4 | 220 | 2058 | 751 | 1034 | 72251 | 152657 | 2.11 | 334.4 | 51.63 |
| | 5 | 210 | 2150 | 785 | 1032 | 70220 | 167411 | 2.38 | 310.4 | 56.07 |
| | 6 | 240 | 1878 | 685 | 1030 | 74263 | 137355 | 1.85 | 251.3 | 56.02 |
| | 7 | 360 | 1229 | 449 | — | 84386 | 163038 | 1.93 | 27.6 | 17.43 |

As shown in Table 2, in the case of Examples 1 to 6 in which a seed suspension polymerization method using a vinyl chloride polymerization seed was applied and the polymerization conversion rate and the temperature difference between each polymerization reaction were controlled to be in specific ranges when preparing the polymerization seed, reaction time was shortened at the same conversion rate and the polymerization production yield per unit time were improved when compared with Comparative Examples 1 to 7. Also, it can be confirmed that the average pore diameter and porosity of a polymer produced in each of Examples 1 to 6 were greater when those of a polymer produced in each of Comparative Examples 1 to 7. Specifically, it can be confirmed that a porosity of 60% or greater was secured in each of Examples 1 to 6. In addition, it can be confirmed that the polydispersity index (PDI) of each of Examples 1 to 6 was within the range of 2.0 to 2.3.

Specifically, in the case of Comparative Examples 1 and 2 in which seed polymerization was not applied, and in the case of Comparative Example 3 in which a polymerization seed having a polymerization conversion rate out of the value range of the present invention was prepared and the polymerization temperature of the preliminary polymerization and the main polymerization was also out of the specific value range of the present invention, the polymerization production yield was significantly lower than that of each of Examples 1 to 6, and the polydispersity index was less than 2.0, indicating that the physical properties of a polymer specified in the present invention were not achieved. In addition, when looking at the pore properties within each polymer, it can be confirmed that the average pore diameter also had a small value when compared with Examples 1 to 6 and the porosity also had a low value, which was less than 60%.

In addition, in the case of Comparative Example 4 in which seed polymerization was applied as in the present invention but the polymerization conversion rate of a seed was out of the value range of the present invention, it was confirmed that the polymerization production yield, polydispersity index, and average pore diameter were at a level similar to that of the present invention but the porosity of a polymer had a low value which was less than 60%. In the case of Comparative Example 5 in which the temperature difference between the preliminary polymerization and the main polymerization was out of the value range of the present invention, the polymerization production yield and average pore diameter were at a level similar to that of the present invention, but the polydispersity index was greater than 2.0 which is out of the range of the present invention and the porosity also had a low value, which was less than 60%.

In addition, in the case of Comparative Example 6 in which the seed polymerization rate was in the same value range as that of Examples but the polymerization temperature of the preliminary polymerization and the main polymerization was maintained to be the same, the productivity improvement effect was insignificant when compared with Examples 1 to 6, and the porosity was less than 60% and the polydispersity index was also less than 2.0, both not reaching a desired level. In the case of Comparative Example 7 in which the polymerization conversion rate and the polymerization temperature difference between the preliminary polymerization and the main polymerization were at a level similar to those of Examples but a copolymer instead of a homopolymer was produced, it can be confirmed that the average pore diameter and porosity did not satisfy the physical properties according to an embodiment of the present invention due to the influence of a comonomer, and the polydispersity index was also had a low value, which was less 2.0. In particular, it can be confirmed that the polymerization time was longer and the polymerization production yield was significantly lower in Comparative Example 7 than in Examples 1 to 6. In addition, since a copolymer using two kinds of monomers were produced in Comparative Example 7, there is a problem in that it is difficult to measure the degree of polymerization degree reliably.

Experimental Example 2

Evaluation of Blending Physical Properties of Polymer

1) Evaluation of Initial Coloring Properties

In order to evaluate the initial coloring properties of the vinyl chloride polymer of each of Examples 1 to 6 and Comparative Examples 1 to 6, 1 part by weight of a tin-based stabilizer, 0.5 parts by weight of a lead-based stabilizer, 1.5 parts by weight of a stabilizer, and 45 parts by weight of a plasticizer (DOP), were blended with 100 parts by weight of the vinyl chloride polymer of each of Examples and Comparative Examples, and each blended material was kneaded using a roll at 150° C. for 5 minutes to obtain a sheet. The sheet was cut, overlapped, and press-molded to obtain a compressed sheet. In addition, in the case of Comparative Example 7, blending, kneading, and compressing were in the same manner as described above except that 45 parts by weight of a plasticizer was added to obtain a compressed sheet. The compressed sheet was observed with the naked eye and evaluated, and the results are shown in Table 3 below.

◎: A similar degree of coloring when compared with that of Comparative Example 1, which is not problematic in practical use.

◯: A slightly less but not a problematic degree of coloring when compared with that of Comparative Example 1, which is not problematic in practical use.

X: A degree of coloring clearly different from that of Comparative Example 1, which is problematic in practical use.

2) Amount of Fish Eyes 45 parts by weight of a plasticizer (DOP), 0.1 parts by weight of barium stearate, 0.2 parts by weight of a tin-based stabilizer, and 0.1 parts by weight of carbon black were mixed and kneaded with 100 parts by weight of the vinyl chloride polymer of each of Examples 1 to 6 and Comparative Examples 1 to 6 using a 6-inch roll of a 140° C. for 6 minutes to obtain a sheet having a thickness of 2.3 mm. Thereafter, the number of white transparent particles in 100 cm² of the sheet was shown, and the results are shown in Table 3 below. In addition, a sheet was obtained in the same manner as described above except that the vinyl chloride copolymer of Comparative Example 7 was added with 45 parts by weight of a plasticizer (DOP), and the amount of fish eyes was measured.

3) Melt Viscosity Measurement (Processability Evaluation)

45 parts by weight of a plasticizer (DOP) was blended with 100 parts by weight of the vinyl chloride polymer of each of Examples 1 to 6 and Comparative Examples 1 to 6, and melt viscosity was measured using a capillary rheometer (RHEO-TESTER 2000, GOTTFERT Company). The results are shown in Table 3 below. In addition, the vinyl chloride copolymer of Comparative Example 7 was not blended with a plasticizer when measuring melt viscosity.

As shown in Table 3, in the case of Examples 1 to 6 in which a seed suspension polymerization method using a vinyl chloride polymerization seed was applied and the polymerization conversion rate and the temperature difference between each polymerization reaction were controlled to be in specific ranges when preparing the polymerization seed, the number of fish eyes was significantly small when compared to that of Comparative Examples 1 to 7, so that it can be confirmed that the quality of fish eyes (protrusion quality) was improved and it was also confirmed that an excellent level of initial coloring properties were exhibited. In addition, it can be confirmed that Examples 1 to 6 have lower melt viscosity when compared with Comparative Examples 1 to 3, 6, and 7. Low melting viscosity indicates good flowability, and is an indicator indicating that excellent processability may be achieved. Therefore, it can be confirmed that processability was improved in Examples 1 to 6 when compared with Comparative Examples 1 to 3, 6, and 7.

Meanwhile, Comparative Examples 4 and 5 had a melt viscosity similar to that of the present invention, but the number of fish eyes was significantly large and the quality of initial coloring properties was also confirmed to be deteriorated to a level which is problematic in practical use.

The foregoing description of the present invention has been presented for purposes of illustration. It will be understood by those skilled in the art that various changes in form and details may be made therein without departing from the spirit and scope of the invention. It is therefore to be understood that the above-described embodiments are illustrative in all aspects and not restrictive.

The invention claimed is:

1. A vinyl chloride polymer comprising a polydispersity (PDI) of 2.0 to 2.3 and a porosity of 60% to 75%,
   wherein the vinyl chloride polymer is a vinyl chloride homopolymer, and
   wherein the vinyl chloride polymer has an average pore diameter (4V/A) of 300 nm or greater.

2. The vinyl chloride polymer of claim 1, wherein the vinyl chloride polymer has an average pore diameter of 300-600 nm.

3. A method for preparing the vinyl chloride polymer of claim 1, the method comprising:
   polymerizing a first vinyl chloride monomer in a preliminary polymerization reactor such that the polymeriza-

TABLE 3

| | | Number of fish-eyes | Initial coloring properties | Melt viscosity (Pa · s) shear rate (1/s) | | | | | | | | |
|---|---|---|---|---|---|---|---|---|---|---|---|---|
| | | | | 100 | 200 | 300 | 400 | 500 | 600 | 700 | 800 | 1000 |
| Examples | 1 | 3 | ◎ | 775.31 | 606.63 | 511.2 | 382.55 | 331.23 | 268.28 | 246.72 | 224.68 | 188.85 |
| | 2 | 4 | ◎ | 706.34 | 512.51 | 437.67 | 342.25 | 309.07 | 266.78 | 226.45 | 221.54 | 162.83 |
| | 3 | 2 | ◯ | 648.25 | 502.65 | 381.9 | 303.24 | 231.48 | 206.44 | 164.17 | 142.69 | 122.11 |
| | 4 | 3 | ◎ | 740.35 | 576.47 | 453.21 | 350.83 | 300.55 | 251.23 | 512.54 | 176.64 | 154.72 |
| | 5 | 4 | ◯ | 681.22 | 520.81 | 431.33 | 326.72 | 280.13 | 230.24 | 193.77 | 156.29 | 138.32 |
| | 6 | 4 | ◎ | 742.64 | 596.38 | 493.45 | 372.59 | 321.87 | 264.58 | 240.32 | 220.06 | 177.73 |
| Comparative Examples | 1 | 5 | ◎ | 916.38 | 655.36 | 571.78 | 441.18 | 367.59 | 314.93 | 283.62 | 257.65 | 218.62 |
| | 2 | 6 | ◯ | 938.41 | 659.14 | 576.09 | 450.92 | 375.62 | 330.68 | 295.08 | 273.96 | 245.72 |
| | 3 | 5 | ◯ | 865.72 | 632.14 | 544.92 | 414.56 | 337.35 | 282.15 | 248.64 | 233.6 | 203.42 |
| | 4 | 20 | X | 757.57 | 592.41 | 491.74 | 393.39 | 301.34 | 268.21 | 214.71 | 188.64 | 161.02 |
| | 5 | 16 | X | 723.03 | 568.45 | 451.23 | 360.87 | 283.99 | 248.35 | 189.95 | 159.53 | 143.17 |
| | 6 | 2 | ◎ | 875.43 | 649.66 | 518.72 | 432.51 | 356.84 | 290.37 | 247.65 | 231.14 | 205.08 |
| | 7 | 2 | ◯ | 718.25 | 612.51 | 537.67 | 442.25 | 409.07 | 366.78 | 326.45 | 321.54 | 262.83 | tion conversion rate thereof is 5 to 20% to prepare a vinyl chloride polymerization seed; and transferring the vinyl chloride polymerization seed to a main polymerization reactor and then polymerizing the vinyl chloride polymerization seed with a second vinyl chloride monomer introduced into the main polymerization reactor to prepare a vinyl chloride polymer, wherein the difference in polymerization temperature between preliminary polymerization and main polymerization is 5-15° C., and the vinyl chloride polymer is a vinyl chloride homopolymer.

4. The method of claim 3, wherein the preliminary polymerization and the main polymerization are suspension polymerization, and the suspension polymerization is performed in the presence of a protective colloid agent and a polymerization initiator.

5. The method of claim 3, wherein the difference in polymerization temperature between the preliminary polymerization and the main polymerization is 10-15° C.

6. The method of claim 3, wherein the vinyl chloride polymerization seed is prepared by polymerization such that the polymerization conversion rate is 5-15%.

7. The method of claim 3, wherein the polymerization temperature of the preliminary polymerization is higher than the polymerization temperature of the main polymerization.

8. The method of claim 3, wherein the first vinyl chloride monomer and the second vinyl chloride monomer are the same vinyl chloride monomer.

\* \* \* \* \*